Inventor
Herbert G. Beede
By Thomas A. Jenckes
Attorney

June 20, 1944.   H. G. BEEDE   2,351,907
APPARATUS FOR MAKING COLLOIDAL STARCH SUSPENSIONS
Filed Oct. 27, 1941   2 Sheets-Sheet 2
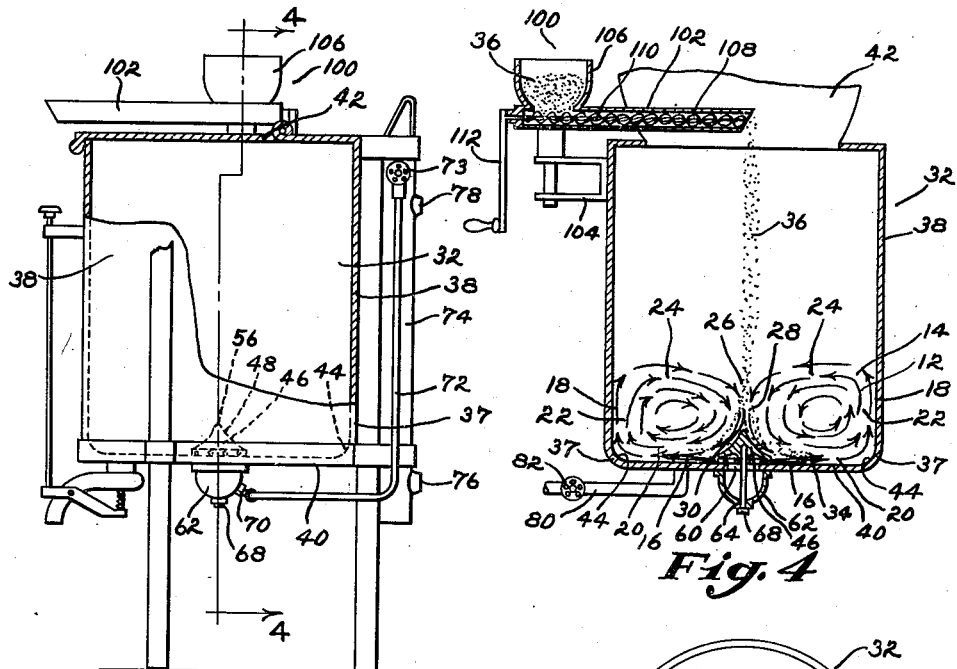
Fig. 3
Fig. 4
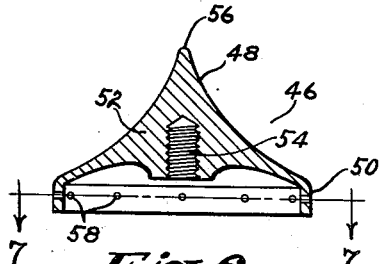
Fig. 6
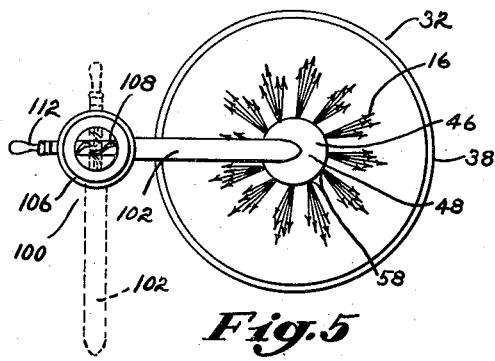
Fig. 5
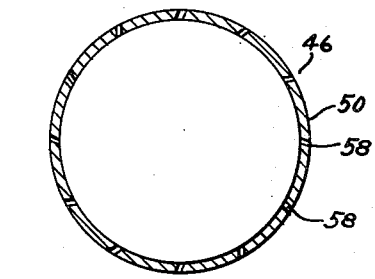
Fig. 7
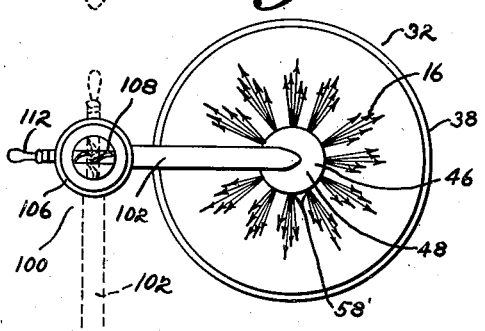
Fig. 8
Inventor
Herbert G. Beede
By Thomas A. Jenckes
Attorney Patented June 20, 1944

2,351,907

UNITED STATES PATENT OFFICE 2,351,907

APPARATUS FOR MAKING COLLOIDAL STARCH SUSPENSIONS

Herbert G. Beede, Pawtucket, R. I., assignor to Pantex Pressing Machine, Inc., Central Falls, R. I., a corporation of Delaware Application October 27, 1941, Serial No. 416,768

6 Claims. (Cl. 127—28)

My invention relates to an improved method and apparatus for making colloidal starch suspensions, particularly adapted for making a colloidal starch suspension suitable for use in laundries or finishing plants for stiffening or sizing the fabrics either in garment form in a laundry or in the piece in a finishing plant.

I am aware that others have employed starch cookers or digesters comprising upright substantially cylindrical tanks with means located centrally of the bottom of the tank to discharge steam therefrom for the purpose of agitating the liquid contained within said tanks and the starch usually deposited therein in mass formation and heating the same to a boiling temperature. While said prior art tanks have been somewhat efficient to dissolve the starch, it has been extremely difficult to dissolve the starch so as not to leave any lumps in the solution without such a prolonged boiling as to result in gelatinization of the starch. So far as I am aware it has been impossible in prior art starch cookers of this type to provide a true colloidal starch suspension, which I have found is highly desirable for laundry and finishing uses. I have discovered that if the fluid in the tank be given a suitable circulation, preferably with the number and amount of starch particles fed to the tank in a controlled manner, that a true highly desirable colloidal starch suspension may be obtained, particularly if the starch be inserted within the tank in the form of dry starch particles. I have discovered that if a suitable amount of water be inserted within a suitably shaped tank and live steam ejected under sufficient pressure radially outwardly from the lower end of the tank containing a confined substantially cylindrical measured body of water in a multiplicity of jets extending a sufficient distance towards the circumferential wall of said tank or body of water that it is possible to substantially provide a torus of circulation with the mixed water and steam stream circulating rapidly outwardly at the lower end of said cylinder with the steam substantially condensing prior to reaching the circumferential side wall thereof and a water stream preheated by said mixed steam and water stream upwardly along the outer wall thereof, radially inwardly substantially to a vortex at the upper end thereof and downwardly along a central axial vertical line for said torical recirculation on contact of supplemental steam from said jets at said lower end while confining said circulating body of water in a container or tank having the lower portion thereof substantially the shape of said recirculating torus. The body of water does not provide a true torus as there is no substantially central vortical hole, but it does provide what I have termed a true torus of circulation, circulating in the manner just described. I am aware that certain prior art structures which have employed a multiplicity of radial jets have tended to provide this torus, and I started my experiments with this prior art type of tank. I have discovered, however, that it is necessary in addition to do various things—to employ steam under sufficient pressure to start the circulation and to preferably employ a nozzle having restricted orifice means to increase the velocity of the steam being discharged, and that the formation of the torus will be aided if the lower portion of the tank be correspondingly streamlined to be of itself of a partly torical formation to prevent the breaking up of the torus by sharp angular edges once it has been tended to be formed by the radially escaping steam jets. In order that a proper torus of circulation be provided, I have discovered that having once provided a suitable nozzle with sufficiently restricted orifice means to feed the steam jets under sufficient velocity to accomplish the initial formation of the torus that an optimum size of orifice existed and that the number of nozzle orifices must be varied so that only a cross sectional area of predetermined amount adjacent the bottom wall of said tank may be fed by each nozzle orifice so that each different sized tank be provided with the proper number of orifices not only to start the desired torical recirculation but to maintain it. The circulation of water in this torical formation might also be likened to the flow of electricity through the windings of a rotor with a squirrel caged winding, with the field of the motor, however, extending substantially to the motor shaft.

A further object of my invention is to produce a true colloidal starch suspension in which the colloidal starch particles are evenly distributed in colloidal form throughout the mass, which will not congeal when cold and which will remain in condition for use without turning rancid and without souring for unusually long periods of time.

A further desirable feature of the torical recirculation heretofore described is that the dry starch particles are carried downward along the central vortical line and guided radially outwardly into the path of radial jets of live steam so that said starch particles may be exploded into a colloidal state, saturated with water and dispersed in the circulating steam and water stream without sufficiently prolonged contact with any portion of the circulating water stream hot enough to harden the exterior of the starch particles to prevent such explosion and with the temperature of all portions of said circulating steam being below the boiling point to prevent any gelatinization.

I have further discovered that this colloidal starch suspension may be more efficiently made without the formation of any lumps if small amounts of the dry starch particles up to the desired predetermined amount are successively sprinkled on the upper surface of said circulating torus so that successive sprinklings of said particles may be successively carried by the then relatively cool water stream portions radially inwardly and axially downwardly adjacent said central vortical line and suitably guided radially outwardly into the path of radial jets of live steam for their proper explosion. I have discovered that if the starch be fed all at once or in too large amounts there is a tendency for it not to be exploded on its first circulation and a tendency for some particles to become so hardened that they will not explode on later recirculation.

I have discovered that if this torical circulation be obtained and the dry starch particles fed in a proper manner, before it is possible for the steam jets to bring the mass of water up to the boiling point, a change will take place in the nature of the mixture, namely the color will change from a milky white to a bluish semi-transparent color and that the mass will simultaneously noticeably swell. This thin colloidal starch is suitable for certain purposes, but supplemental steps may be performed thereon, if desired, to produce different additional desirable types of starches in the manner to be explained.

Further objects of my invention relate to the improvements in the starch digester or cooker I preferably employ, which is preferably provided with means to feed the dry starch particles in small predetermined amounts to the circulating torus and is so shaped or streamlined itself by providing it with a substantially partially torical lower portion to not only assure the formation of the torical recirculation, but to avoid any sharp edges which would tend when once formed to break it up and prevent the desired continuous torus of recirculation, and include not only the streamlining of the container for this purpose, but also the shaping and streamlining of the nozzle employed.

These and such other objects of my invention as may hereinafter appear will be best understood from a description of the accompanying drawings which illustrate an embodiment thereof.

Fig. 3 is a side elevation of my improved starch digester with a portion of the side wall broken away and with the starch feeding means pivoted to an inoperative position.

Fig. 4 is a vertical sectional view taken along the line 4—4 of Fig. 3 with the starch feeding means pivoted to an inoperative position and illustrating the torus of recirculation.

Fig. 5 is a plan view of my improved starch digester with the cover removed, illustrating the inclined fan-shaped paths of the steam jets.

Fig. 6 is a vertical sectional view of the nozzle I preferably employ.

Fig. 7 is a horizontal sectional view taken through the nozzle along the line 7—7 of Fig. 6.

Fig. 8 is a plan view similar to Fig. 5 of a modified form of my invention employing truly radial nozzle orifices.

Figure 2:
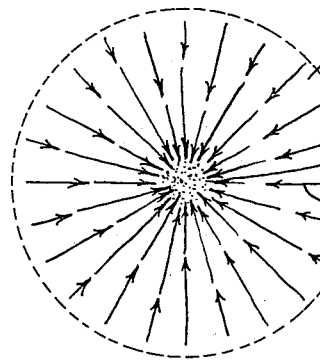
Fig. 2 is a plan view of the torus of recirculation shown in Fig. 1.

In the drawings, wherein like characters of reference generally indicate like parts throughout, 12 generally indicates the torus of recirculation provided by my improved method to prepare a colloidal starch suspension from dry starch particles. For this purpose I eject live steam radially outwardly from the lower end of a confined substantially cylindrical measured body of water 14 in a multiplicity of jets 16 extending a substantial distance towards the circumferential wall 18 of said body under sufficient pressure to substantially provide a torus of recirculation 12 with the mixed water and steam stream formed by the steam jets impinging on the lower portion of said body of water 14, circulating rapidly outwardly along the lower surface of said cylindrical body of water as at 20 with the steam substantially condensing prior to reaching the circumferential side wall 18 thereof and a water stream preheated by said mixed steam and water stream 20 circulating upwardly along the outer wall 18 as at 22, a water stream 24 continuous therewith circulating radially inwardly substantially to a vortex 26 at the upper end of said body of water 14, and with a water stream 28 continuous therewith circulating downwardly along a central axial vortical line 30 for said torical recirculation on contact with supplemental steam from the steam jets 16 at said lower end to again form the continuous circulating streams 20, 22, 24 and 28 of torical recirculation, while confining said circulating body of water 14 in a container 32 having the lower portion 34 thereof substantially the shape of said recirculating torus 12. I supply dry starch particles 36 up to a predetermined amount on the upper surface of the radially inwardly circulating stream 24 of said circulating torus 12, preferably by sprinkling small amounts of dry starch particles 36 on said upper surface so that successive sprinklings of said starch particles 36 may be successively carried by the then relatively cool water stream portions 24 circulating radially inwardly and the portions 28 circulating axially downwardly adjacent said central vortical line 30 and guided radially outwardly in any suitable manner into the path of the radial jets 16 of live steam so that said starch particles 36 may be exploded into a colloidal state, saturated with water and dispersed into the circulating steam and water stream 20 without sufficiently prolonged contact with any portion of the circulating torical water stream 12 hot enough to harden the exterior of the starch particles 36 to prevent such explosion with the temperature of all portions of said circulating stream 12 being below the boiling point to prevent gelatinization of the starch.

While my improved method may be carried out in any suitable manner, I have also illustrated in the drawings, modifications of former types of starch cookers which may be effective to initiate and continue the desired torus of recirculation to accomplish my method. To successively carry out my method, it is essential that the body of liquid 14 may be measured so as to be of the right height to form the torus of recirculation and that the steam be fed under sufficient pressure to set up and continue a torical recirculation and that preferably the steam be fed with a suitable velocity for this purpose, the velocity thereof being preferably increased by the manner of feeding the steam in the suitable substantially radial jets. I have shown in Figs. 3-10 portions of a starch cooker or digester suitable for carrying out my invention, said starch digester preferably comprising an upright substantially cylindrical tank or container 32 of predetermined radius, height and hence capacity, having the cylindrical side wall 38, the bottom wall 40 and the removable top wall 42. As stated, I preferably form the lower portion of said container so as to provide a container having a substantially partially torical lower portion 34. For this purpose I provide an annular portion 37 having an inner surface concaved as at 44 joining the side wall 38 to the bottom wall 40, and I construct the steam nozzle 46 with an upper wall having a cooperating streamlined surface 48. In the embodiment shown, the steam nozzle 46 has a cylindrical side wall 50 which rests on the center portion of the bottom wall 40 of the container 32, and a thickened upper portion 52 having a bolt hole 54 centrally of the lower end thereof, and the top wall 48 projecting substantially conically upwardly to the central apex 56, with the side wall portions 48 thereof inwardly concaved and extending downwardly to said cylindrical side wall 50. The cylindrical side wall 50 is provided with a multiplicity of substantially radial steam discharge orifices 58 discharging directly above said bottom wall 40 to form the steam jets 16. In the embodiment shown, to produce an added whirlpool effect, these orifices 58 are formed in the cylindrical side wall 50 at a slight angle from the radial, as shown in Figs. 5-7, but they may be true radial orifices 58', as shown in Fig. 8. To attach the nozzle 46 centrally of the bottom wall 40 of said container 32, I provide said bottom wall with the hole 60. An inverted bell-shaped container 62 having a hole 64 in the lower end thereof is inserted below said bottom wall 40 immediately below said nozzle 46 and the hole 60 to have the edges thereof abut the lower surface of said bottom wall 40. A suitable bolt 68 is inserted through said bell hole 64 up through said hole 60 and has the threaded end thereof inserted within the nozzle hole 54, clamping the nozzle 46 and inverted bell 62 in a rigid position centrally of said bottom wall 40, with the respective lower and upper surfaces thereof abutting the respective lower and upper surfaces of said bottom wall 40 exterior of said hole.

The inverted bell 62 is also provided with the steam inlet orifice 70 to which the steam inlet pipe 72 may be suitably attached. In the embodiment shown, I have employed a supplemental steam separator 74 having a condensed water outlet connection 76 at the lower end thereof, and a steam inlet connection 78 adjacent the upper end thereof. A water pipe 80 having a suitable shutoff valve 82 therein also discharges into said container through said bottom wall 40. In the embodiment shown I preferably employ between 90 and 100 pounds of steam pressure, and I construct the orifices 58 of such a size that their combined cross sectional area is substantially less than the total cross sectional area of the steam pipe 70, in the embodiment shown the cross sectional area of the steam pipe being .0607 sq. in. and the cross sectional area of each nozzle being #50 drill or .0038 sq. in. Thus the velocity of the escaping steam is increased with a Venturi effect and a considerable reservoir of pressure may be built up behind the orifices 58 in the nozzle 46, bell 62 and steam pipe 72 so as to insure that the steam jets be fed under equalizing pressure at a maintained velocity despite any variations in the pressure supplied by the pump. As stated, the steam is fed under sufficient pressure and with a sufficient velocity to set up the torus of recirculation 12 hitherto described. The shape of the concaved conical upper wall 48 of the nozzle is such that the down stream 28 of the circulating torus 12 may be directed outwardly to deposit the entrained particles 36 at the best possible angle in the path of the steam jets 16 so that steam may act on the starch particles 36 to cause their explosion without sufficiently prolonged contact to harden the exterior of the starch particles to prevent such explosion. The concaved inner surface 44 of the angular portion 37 also assists in maintaining the torus of recirculation, preventing the formation of any dead angular pockets of liquid where the cylindrical side wall 38 meets the lower wall 40 were this concaved surface 44 not provided. I have found from experiment that the concaved surface 44 and the concaved surface 48 of said nozzle positively permit the formation and maintenance of the desired torus of recirculation 12, while prior art structures without these features have tended initially through the action of their steam jets 16 to set up such a torus of circulation, sharp corners at these points have positively prevented its formation, and the downwardly projecting stream 28 of such a torus has been definitely broken up and dissipated by a flat upper nozzle surface.

Figure 9:
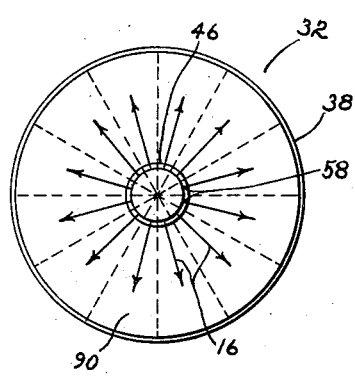
Fig. 9 is a diagrammatic plan view of the base of the tank and attached nozzle, illustrating the proper number of nozzle orifices for a tank of the size shown in Figs. 3–8.
Figure 10:
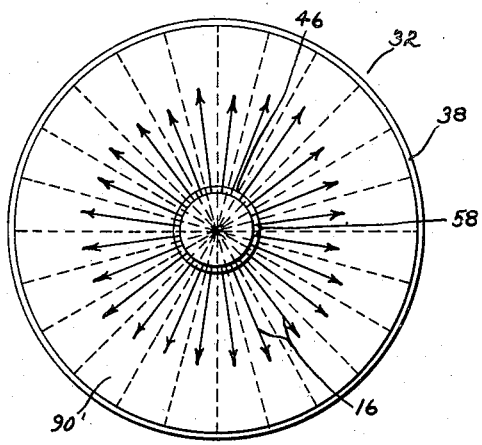
Fig. 10 is a diagrammatic plan view of the base of a tank and attached nozzle, illustrating the proper number of nozzle orifices for a tank of much larger size so that a substantially sector shape cross sectional area of predetermined amount only adjacent the bottom wall of said tank, may be fed by each respective nozzle orifice.

As stated, the velocity of the steam is controlled by the relative size of the orifices and the pressure. I have also discovered that a tank or container 32 of any suitable size may be made, provided that the number of nozzle orifices is such that, as shown in Figs. 9 and 10, only a substantially sector shaped cross sectional area 90 or 90' of predetermined amount adjacent the bottom wall of said tank is fed by each nozzle orifice 58. I have shown in Figs. 9 and 10 diagrammatic plan views of the bottom walls of different sized containers, the one shown in Fig. 9 having a diameter of 18", and the one shown in Fig. 10 having a diameter of 26". Operating with the shape of nozzle and container hitherto described, under the steam pressure hitherto described and with the size nozzle orifice hitherto described, I have discovered that if $x$ equals the number of nozzle orifices, $a$ equals the area of the bottom of said nozzle 46 and $b$ equals the area of the bottom wall 40 of said tank, that $$\frac{b-a}{x}$$

equals the desired area of said bottom wall to be fed by each nozzle orifice, which is always constant despite variations in $a$ and $b$ and with the figures hitherto given, varies substantially between 20–22 square inches. Thus in the embodiments shown in Figs. 9 and 10, the number of nozzle orifices in each embodiment is such as to feed the substantially sector shaped cross sectional area 90 or 90' of equal predetermined area, in the embodiment shown between 20–22 square inches, said for this purpose 12 orifices are employed in the embodiment shown in Fig. 9 and 24 in the embodiment shown in Fig. 10. Employing this principle with a given size orifice and a given steam pressure, it is obvious that any sized tank may be constructed to operate efficiently in accordance with my invention by merely varying the number of effective orifices. For this purpose the effective diameter of the nozzle 46, as shown in Fig. 6, may be varied from that shown in Fig. 9 to that shown in Fig. 10 to cause a less variation in the width of the sector shaped areas 90 and 90'.

As stated, I also provide means to successively deposit a predetermined amount of starch particles 36 within the center portion of said container 32 or torus of recirculation 12. While any suitable type of means may be provided for this purpose, in the embodiment shown, I provide the rotatable screw device 100 having a horizontally disposed conduit 102 pivotally mounted on a suitable bracket 104 mounted on said container 32 to pivot from the operating position shown in Fig. 4 to the non-operating position shown in Fig. 3. A suitable hopper 106 is provided adjacent the outer end of said conduit 102 and a suitable screw 108 is inserted within said conduit, mounted on a suitable axle 110 operated by a suitable handle 112 projecting radially outwardly from the conduit 102. To operate, the conduit 102 is moved to the radial operating position shown in Fig. 4, the desired predetermined amount of starch particles 36 deposited in the hopper 106, and the handle 112 slowly rotated to cause the screw 108 to carry a limited amount of starch particles radially inwardly and deposit them on the upper surface of the torus 12 so that they may be drawn inwardly down the center vortical line 30 and feed to the steam jets 16 in the manner previously described. It is obvious, however, that any other suitable type of means may be provided to successively sprinkle or deposit small amounts of dry starch particles on said surface.

Figure 1:
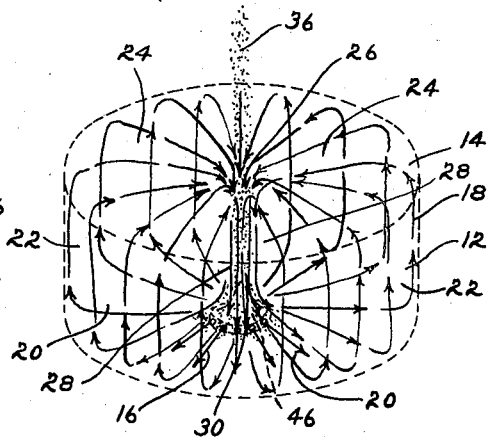
Fig. 1 is a perspective view of the torus of circulation I provide by my improved method, illustrating how the sprinkled dry particles of starch are drawn along the central vortical line thereof and into the path of the jets of steam.

To employ my improved starch cooker, in the embodiment shown of twenty gallon capacity, I first run six or eight gallons of water into the container 32 through the water pipe 80, filling the twenty gallon tank more than one-third full, as shown in Fig. 4. I then turn on the steam, being sure to drain the water from the separator 74 before so doing to be sure that the steam is dry. With this amount of water, and with the steam fed in the desired velocity, the torus of circulation 12 which is shown in Fig. 1 will be set up in the bottom of the tank 32, as shown in Fig. 4. As soon as the steam begins to circulate the water to form said torus 12, I successively sprinkle a measured quantity of starch particles 36 on the upper surface of the torus by suitable operation of the handle 112, turning the handle to so sprinkle the starch particles 36 until the predetermined amount of starch has been added. It is necessary to carefully watch the starch during this operation, and after a certain time, usually less than four minutes, (the time normally required to bring the starch to the boiling point) the color changes from a dead milky white to a substantially blue opalescent transparent color, and simultaneously with this color change there will be a supplemental increase in volume, indicating that the starch is properly cooked. This starch may be used direct, but it is still too thick for most purposes. The steam may then be left on and the water turned on to dilute the cooked starch to the proper concentration, in this instance filling up the container 32. If thin boiling starch is desired, the steam is kept on while adding the water. This will give a thin boiling or penetrating starch. As the water is added, a decided change in the torus takes place, so that as the container 32 becomes substantially full the torus largely disappears, and while a continued amount of torical recirculation takes place, it is much less marked. If the orifices 58 be formed at an angle to the radial, as shown in Figs. 6 and 7, a whirlpool effect will then become observable on the thus enlarged cylindrical body of water 14, with no true vortex 26 being formed, but with the circulation attempting to form such a vortex, but due to the swirling action provided by the angularity of the nozzle holes 58, causing said vortex to initially appear and disappear as it swings radially outwardly in the swirling mass.

If a so-called glazing, cooked or raw starch is desired, the cooked starch must be cooled below 140°, which is accomplished by closing the steam valve 73 during the adding of water and sprinkling raw starch on the surface of the cooled cooked starch, which may be suitably incorporated therein by stirring with a paddle. If the water is drawn off from the separator before turning off the steam, the starch will be less thinned out. It is desirable to use in each instance dry starch which has not previously absorbed water.

It is apparent, therefore, that I have provided a novel method of preparing colloidal starch suspensions from dry starch particles and a novel starch digester suitable for use in carrying out said method, with the advantages explained above.

It is understood that my invention is not limited to the specific embodiment shown or method described and that various deviations may be made therefrom without departing from the spirit and scope of the appended claims.

What I claim is:

1. A starch digester comprising an upright substantially cylindrical tank of predetermined radius, height and hence capacity having side, top and bottom walls, and an annular portion having a concaved inner surface joining the side and bottom walls thereof, a steam nozzle having a multiplicity of horizontal substantially radial steam discharge orifices therein discharging immediately above said bottom wall and a top wall projecting substantially conically upwardly to a central apex with inwardly concaved side wall portions extending downwardly substantially to said steam discharge orifices to provide a container having a substantially partially torical lower portion, means to supply steam under substantial pressure to said nozzle, and means to successively deposit a predetermined amount of starch particles within the center portion of the upper end of said container.

2. A starch digester comprising an upright substantially cylindrical tank of predetermined radius, height and hence capacity having side, top and bottom walls, and an annular portion having a concaved inner surface joining the side and bottom walls thereof, a steam nozzle having a multiplicity of horizontal substantially radial steam discharge orifices therein discharging immediately above said bottom wall and a top wall projecting substantially conically upwardly to a central apex with inwardly concaved side wall portions extending downwardly substantially to said steam discharge orifices to provide a container having a substantially partially torical lower portion, and means to supply steam under substantial pressure to said nozzle.

3. A starch digester comprising an upright substantially cylindrical tank of predetermined radius, height and hence capacity having side, top and bottom walls, a steam nozzle having a multiplicity of horizontal substantially radial steam discharge orifices therein discharging immediately above said bottom wall and a top wall projecting substantially conically upwardly to a central apex with inwardly concaved side wall portions extending downwardly substantially to said steam discharge orifices, means to supply steam under substantial pressure to said nozzle, and means to successively deposit a predetermined amount of starch particles within the center portion of the upper end of said container.

4. A starch digester comprising an upright substantially cylindrical tank of predetermined radius, height and hence capacity having side, top and bottom walls, a steam nozzle having a multiplicity of horizontal substantially radial steam discharge orifices therein discharging immediately above said bottom wall and a top wall projecting substantially conically upwardly to a central apex with inwardly concaved side wall portions extending downwardly substantially to said steam discharge orifices, and means to supply steam under substantial pressure to said nozzle.

5. A starch digester comprising an upright substantially cylindrical tank of predetermined radius, height and hence capacity having side, top and bottom walls, and an annular portion having a concaved inner surface joining the side and bottom walls thereof, a steam nozzle having a multiplicity of horizontal substantially radial steam discharge orifices therein discharging immediately above said bottom wall and a top wall projecting substantially conically upwardly to a central apex with inwardly concaved side wall portions extending downwardly substantially to said steam discharge orifices to provide a container having a substantially partially torical lower portion, means to supply steam under substantial pressure to said nozzle, and means to successively deposit a predetermined amount of starch particles within the center portion of the upper end of said container, the number of nozzle orifices being such that only a substantially sector shaped cross sectional area of predetermined amount adjacent the bottom wall of said tank is fed by each nozzle orifice.

6. A starch digester comprising an upright substantially cylindrical tank of predetermined radius, height and hence capacity having side, top and bottom walls, a steam nozzle having a multiplicity of horizontal substantially radial steam discharge orifices therein discharging immediately above said bottom wall and a top wall projecting substantially conically upwardly to a central apex with inwardly concaved side wall portions extending downwardly substantially to said steam discharge orifices, the number of nozzle orifices being such that only a substantially sector shaped cross sectional area of predetermined amount adjacent the bottom wall of said tank is fed by each nozzle orifice.

HERBERT G. BEEDE.